United States Patent
Ruiz et al.

(10) Patent No.: US 6,516,268 B2
(45) Date of Patent: Feb. 4, 2003

(54) BUNDLED MAP GUIDE

(75) Inventors: Patrick Ruiz, Jamaica Plain, MA (US);
Nicola Valentino, Brookline, MA (US);
John W. Sumner, Ipswich, MA (US);
Mike Goldstein, Peabody, MA (US);
Charles Freedman, Brookline, MA (US);
Craig Runyan, Boston, MA (US)

(73) Assignee: Wizeguides.com Inc., Jamaica Plain, MA (US)

( * ) Notice: Subject to any disclaimer, the term of this patent is extended or adjusted under 35 U.S.C. 154(b) by 0 days.

(21) Appl. No.: 09/788,005

(22) Filed: Feb. 16, 2001

(65) Prior Publication Data

US 2002/0116120 A1 Aug. 22, 2002

(51) Int. Cl.[7] .............................................. G09B 29/00
(52) U.S. Cl. ....................................... 701/208; 701/212
(58) Field of Search ................................ 701/208, 212, 701/200; 173/178 R; 340/990, 995

(56) References Cited

U.S. PATENT DOCUMENTS 5,448,696 A * 9/1995 Shimada et al. ............ 345/427
5,802,492 A 9/1998 Delorme
6,009,375 A 12/1999 Sakumoto
6,208,934 B1 * 3/2001 Bechtolsheim et al. ..... 340/988
6,321,158 B1 * 11/2001 DeLorme et al. ........... 340/995

OTHER PUBLICATIONS http://www.mta.nyc.ny.us/nyct/maps/submap.htm—New York subway system interactive web–page. five pages.*

* cited by examiner

Primary Examiner—William A. Cuchlinski, Jr.
Assistant Examiner—Olga Hernandez
(74) Attorney, Agent, or Firm—Caesar, Rivise, Bernstein, Cohen & Pokotilow, Ltd.

(57) ABSTRACT

A method is disclosed for providing a display of a cartographic map representative of a subway line within a geographic region in a system having a display device with an indicator device. A plurality of map displays represents at least a portion of a subway line for display on the display device and provides a plurality of display layers in accordance with the plurality of map displays for determining a map display of plurality of map displays. A plurality of view select zones corresponding to the plurality of display layers is displayed to permit a user to select a display layer in response to selecting a view select zone using indicator device and selected display layer is applied to display device.

64 Claims, 7 Drawing Sheets

**Show it
will and they
come.**

WIZEGUIDES

65 — The Union Oyster House

The Union Oyster House is the oldest restaurant in Boston and the oldest restaurant in continuous service in the U.S. - the doors have always been open to diners since 1826 Union Street was laid out in 1636, but there are no municipal records documenting the Oyster House's date of construction. All that is known is that the building has stood on Union Street as a major local landmark for more than 2 years. The first stirrings of the American Revolution reached the upper floor of the building in 1771, when painter Isaiah Thomas published his newspaper " The Massachusetts Spy," long known as the oldest newspaper in the United States. It was at the Oyster Bar that Danial Webster, a constant customer, daily drank his tall tumbler of brandy and water with each half-dozen oysters, seldom having less than six plates. The toothpick was first used in the United States at the Union Oyster House.  enterprising Charles Forster of Maine first imported the picks from South America. To promote his new business he hired Harvard boys to dine at the Union Oyster House and ask for toothpicks. The Kennedy Clan has patronized the Union Oyster House for years. J.F.K. loved to feast in privacy in the upstairs dining room. His favorite booth " The Kennedy Booth " has since been dedicated in his memory.  Since 1826, the Union Oyster House has known only three owners.  Carrying on proud traditions in dining and service since 1970 have been Mr. Joseph A. Milano, Jr., and Ms. Mary Ann Milano Picardi.  Lunch, Dinner, and Dessert are served daily, with children's menu selection.  The Union Bar is on premises, too Hours: Sunday - Thurs, 11am-9:30pm, Friday and Saturday, 11am-10pm Union Bar Open til Midnight
http://www.unionoysterhouse.com/

FIG. 4

BUNDLED MAP GUIDE

This invention relates to the field of cartography and, in particular, to providing a visual display of a selected map stored along with a plurality of differing maps on a visual display device.

BACKGROUND OF THE INVENTION

Many cities are known to be good areas for walking, typically for several reasons. For example, many cities are rich in historic appeal. Many have a wealth of major attractions, including both venue and events, within walking distance of each other. As a result of attractions such as these, major pedestrian areas receive millions of visitors a year.

However, logistical difficulties can sometimes diminish the appeal of walking through cities. For example, the streets in Boston are laid out in an irregular often confusing manner, with many one way streets. There is a dearth of public parking spaces and parking garages are costly. The metropolitan Boston area also suffers from a lack of street signs. Travelers can often go for several blocks without seeing street signs, which creates considerable frustration.

Additionally, Boston is currently going through a major renovation. The Central Artery Project, also referred to as the "Big Dig," is the largest roadway construction project in history. The "Big Dig" causes traffic jams and even more confusion when traveling by vehicle. Thus, driving in the Boston area is a largely unappealing prospect. Coupled with the fact that the subway system has the lowest priced subway fares in the United States, this scenario further encourages travelers in the greater Boston area to walk and use the subway rather than to drive to their destinations. In addition to Boston, approximately one-hundred eighty cities worldwide have subway systems Thus, good quality maps can be very useful when walking along city streets. Preferably, subway and pedestrian maps are substantially different from driver-oriented maps. Local businesses and attractions can assist pedestrian consumers in locating their venues and events, and encourage patronage of their establishments by pinpointing their locations on the maps.

One type of map that is therefore useful for helping travelers to get around in a city is a subway map showing one or more subway lines. In many cases finding a subway station in major cities can be difficult. Even if one sees a sign indicating a subway entrance from a distance, a closer investigation is usually required to determine which subway line the station services. Some major downtown stations are not marked at all on the street level. Furthermore, many stations have separate entrances for inbound and outbound service and separate stairways for entrances and exits. Some stations have separate entrances for each line, and the entrances can be scattered across a radius of up to two blocks. Thus, it is useful for subway riders who are not familiar with a particular line or station to have a reference tool to locate the most efficient subway line and passageway to the subway line including inbound and outbound entrances and exits of the subway line.

Many subway stations have more exits than entrances. One station may have a number of exit doorways in an area of one or more city blocks. This can be confusing even to a regular subway rider. Furthermore, when one is below the ground level it is often difficult to know the most convenient surface exit to use for a particular destination. Additionally, those who are unfamiliar with the subway system do not know how close another subway line may be. The result can be unnecessary subway travel time to make a direct transfer, when a much shorter travel time above ground would do as well. Subway riders are therefore in need of a reference guide which will depict the numerous station exits located at street level, as well as the proximity of stations on different lines.

Because of the haphazard street layout and logistical challenges of cities such as Boston, an address on an advertisement does not adequately convey the business or attraction location. Presently, advertisers must relate their business location to the nearest landmark or subway stop. There is a distinct need for businesses and attractions to have a clearer, map-based way in which to communicate their location to potential customers.

Geo-specific locators on the map are visual aids to depict locations of events, business locations, sites and attractions, to which travelers are likely to venture. For example, the Boston metropolitan area is home to nearly a quarter million college students and hosts over 11.5 million tourists each year. The education and tourist industries rank second and third, respectively, in terms of state revenue, leading to a significant amount of advertising and marketing geared toward students and tourists. While there are a number of college-oriented and tourist-oriented-advertising publications, there is still a need for a map-based manner in which these largely pedestrian-and subway-oriented demographics can be targeted by local businesses and attractions.

Downloadable walking instructions between user location in various cities are available from Vindigo, an internet-based company. Additionally, internet-based services for providing maps are known in the art. For example, Maptuit.com provides maps having symbols wherein a window corresponding to a symbol appears when a user rolls a mouse indicator over the symbols. The window can display, for example, a name of a business corresponding to the symbol. Additionally, if the user clicks the mouse, a small information page containing information about the corresponding business appears.

Mapblast.com is a Global Positioning System-(GPS) based mapping site that displays the trademarks of business on a map at a location corresponding to the geographic location of the business. It permits the user to select categories of business or attractions using a drop down menu, for example, hotels, restaurants, or ATMs. Selection of a category results in the display of the trademarks of all the establishments in the selected category. Other GPS-based systems include MapQuest.com, Delorme.com, and Maps.com. A prior art system, jungleport.com, provides downloadable maps and directions for users.

There are also search engines like Yahoo! that have a license to maps provided by MapQuest.com for permitting travelers to obtain maps of areas they intend to travel. Some of these sites allow users to zoom in to various levels of map detail, as well as to locate addresses on their maps. However, these sites are oriented towards drivers of motor vehicles. They do not provide subway or pedestrian-oriented information.

The video displays of maps obtained from internet-based map providers and search companies are downloadable, one video display at a time. Thus, a user can locate a desired map display and download it into a personal device for later use. For example, video displays of maps are downloaded one video display at a time into personal computers and personal digital assistants (PDAs). There are also some maps, like Jungleport for instance, that allow a download of the entire map and, hence, all video displays are downloaded for later access.

SUMMARY OF THE INVENTION

The system and method of the present invention provides a guide for assisting a user in traveling in a predetermined geographic area, for example, for use in a city to help locate venues and events while in that area. The present invention is particularly advantageous when applied to such a city area having a subway system therein. One feature of the guide is a high level view of such a subway system wherein symbols representative of the various features of the subway system such as entrances and exits are provided. The high level view includes a representation of the subway system overlaid onto a representation of the city to form a composite map. The representation of the city within the composite map can be a detailed street map or any other kind of map, and can include bus lines, walking paths, bicycle paths, or any type of information.

The composite map can be provided as a hard copy, but is preferably displayed on a video display device. The video display device can be, for example, the video monitor of a personal computer, the screen of a PDA, or the display of any other type of electronic device coupled to a web page server or other type of server of a provider of the system and method of the invention.

The user is provided with map screens showing a series of progressively more magnified and detailed levels, or zoom levels, of the composite map. One way for the user to navigate from one map screen to another is by using a star shaped compass having a plurality of compass points displayed beside the map. By clicking on a selected compass point the user is able to change a currently shown map screen to the next map screen, in the direction corresponding to the clicked compass point.

Enlarging and compressing of images of the map screens in order to perform the zoom in and zoom out functions without distortion of the dimensions of the images is made possible through the use of vector objects and vector methods. The video display technology used in the preferred embodiment permits the full range of system functions. Zooms and links between displays, will be available to users during offline operation on their own personal computers and PDAs, when the user downloads maps from the provider of the method of the invention. In order to permit offline operation in this manner, a substantial amount of display layering information and display overhead information is received by the user at the time of the download. In the preferred embodiment, for example, information representative of nineteen layers is received at the time of the map download.

In addition to the subway station entrances and exits being displayed on a composite map screen, they are individually identified as either an entrance or an exit. The entrances and exits with wheelchair access are also indicated on the map screen. Additionally, an index is provided along with the composite map to list the streets of the city along with the corresponding map screens and grid locations on which the streets are located, in order to assist the user in locating the streets shown in the guide.

The geographic locations of local businesses and attractions located within the geographic area represented by the map screen are indicated by icons on the map. Preferably, the icons are shown on the highest level of magnification of the map and on the next highest level of magnification. The icons are the trademarks of the businesses in the preferred embodiment, but can be any other type of indicator capable of representing the business or attraction.

By clicking on an icon of a business or attraction displayed in this manner, a user receives more detailed information about the corresponding business or attraction. The more detailed information is previously obtained from the business or attraction and stored as a customer profile. The customer can include in the profile, for example, such information as addresses, restaurant menus, hotel rates, business hours, show times, internet links, etc. When the user clicks on an icon, stored information in the form of flat text, video streaming, or in any other format, is provided to the user from a back-end server.

The businesses and attractions are also listed by industry categories that are selectable by buttons shown on the video display. For example, a user can request a display of the locations of all coffee shops, ATMs, hotels, or restaurants of a certain type in the area, represented on a displayed map screen. The businesses and attractions, along with their icons, can be listed on drop down menus. When a user clicks on a business or attraction presented on a drop down menu, a corresponding icon appears on a map screen at the corresponding location. If a business has more than one location, the closest location corresponding to the displayed map appears. Additionally, the user can request a display of the icons corresponding to all of the businesses and attractions available on the map screen using a single button which is also shown on the video display.

When a user determines a route to be traveled through a geographic region represented according to the invention, the user can obtain walking directions and travel time between the beginning and end points of the route. A travel itinerary setting forth the walking directions for the venues or events can be stored online by the user and protected using a password. The user can download map displays, the travel itinerary and other information provided in this manner to a personal computer, a PDA, or any other device.

Thus, a method is disclosed for providing a display of a cartographic map representative of a subway line within a geographic region in a system having a display device with an indicator device for indicating a display location on the display device corresponding to a geographic location within the geographic region. The method includes providing a plurality of map displays representative of at least a portion of the subway line for display on the display device and providing a plurality of display layers in accordance with the plurality of map displays for determining a map display of the plurality of map displays when a display layer of the plurality of display layers is applied to the display device. A plurality of view select zones corresponding to the plurality of display layers is displayed to permit a user to select a display layer in response to selecting a view select zone using the indicator device and the selected display layer is applied to the display device. A selected map display is provided on the display device corresponding to the applied display layer including at least a portion of the subway line.

A system is provided for displaying a cartographic map representative of a subway line within a geographic region upon a display device for providing a display having a plurality of display fields, the system having an indicator device for indicating a display location on the display device and information about an attraction located within the geographic region. A description information display field for receiving and displaying description information corresponding to the attraction and an icon information field for receiving and displaying icon information representative of an icon corresponding to the attraction are provided. A screen displayed upon the display device representative of the geographic region and icon information and a display of descriptive information is provided upon the display device in response to indicating the display representative of icon information using indicator device.

DESCRIPTION OF THE DRAWINGS

FIGS. 1 A—E show a plurality of map screens displayed in accordance with the present invention.

FIGS. 2 A–B show a vector representation method suitable for use in providing the map screen displays of the invention of FIGS. 1 A–E.

FIG. 4 shows a profile page for entering data into the system of the present invention.

DETAILED DESCRIPTION OF THE PREFERRED EMBODIMENT

Referring now to FIGS. 1 A–E, there are shown map screens 10–18 which are part of a map display in accordance with the present invention. Map displays in the preferred embodiment of the invention are a collection of map screens such as the map screens 10–18 that are programmed using a video display method available known as Flash which is available from Macromedia. There are two essential aspects to the video display technology used. First, it permits a vector based program which allows the user to enlarge or compress the images of map screens without losing proportionality in either dimension. Second, map displays that are programmed using the preferred video display technology can be programmed as a plurality of layers of maps, wherein each layer is represented as the composite map displayed on the screen. Each layer is assigned a unique code number in order to permit the layers to be accessed when needed. For example, the five map screens 10–18 are each represented as a layer and each such layer is assigned its own code number.

Figure 1A:
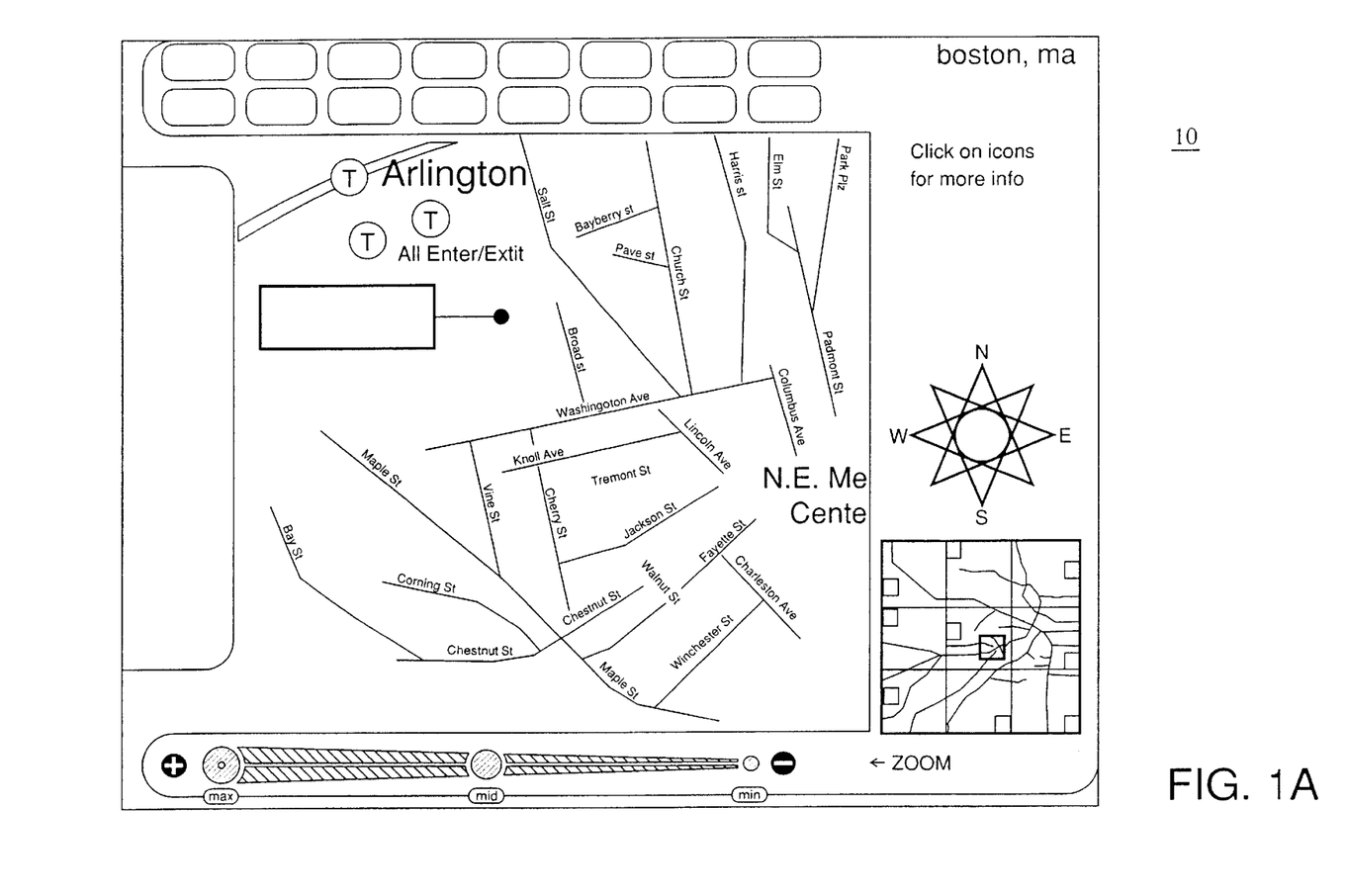
Figure 1B:
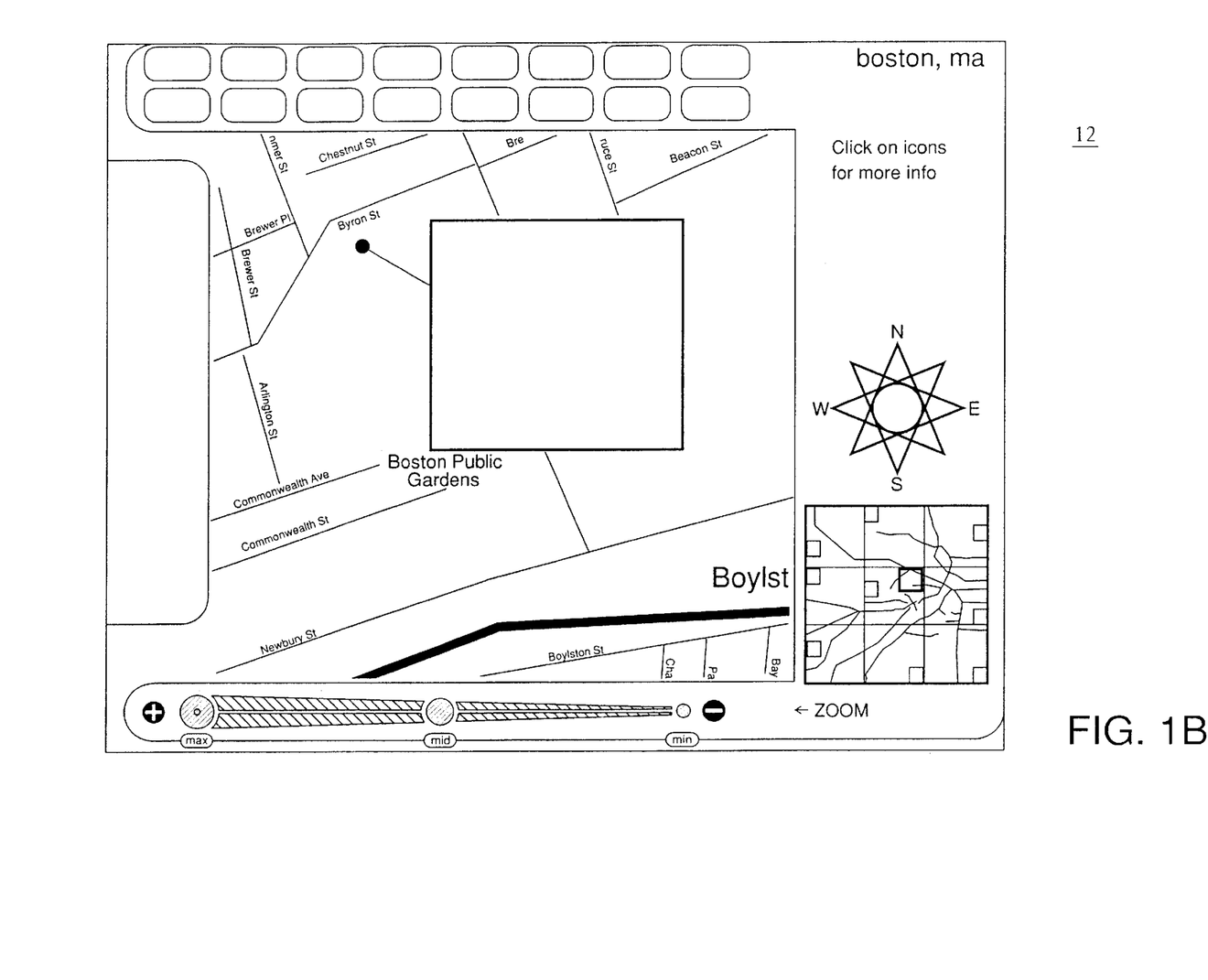
Figure 1C:
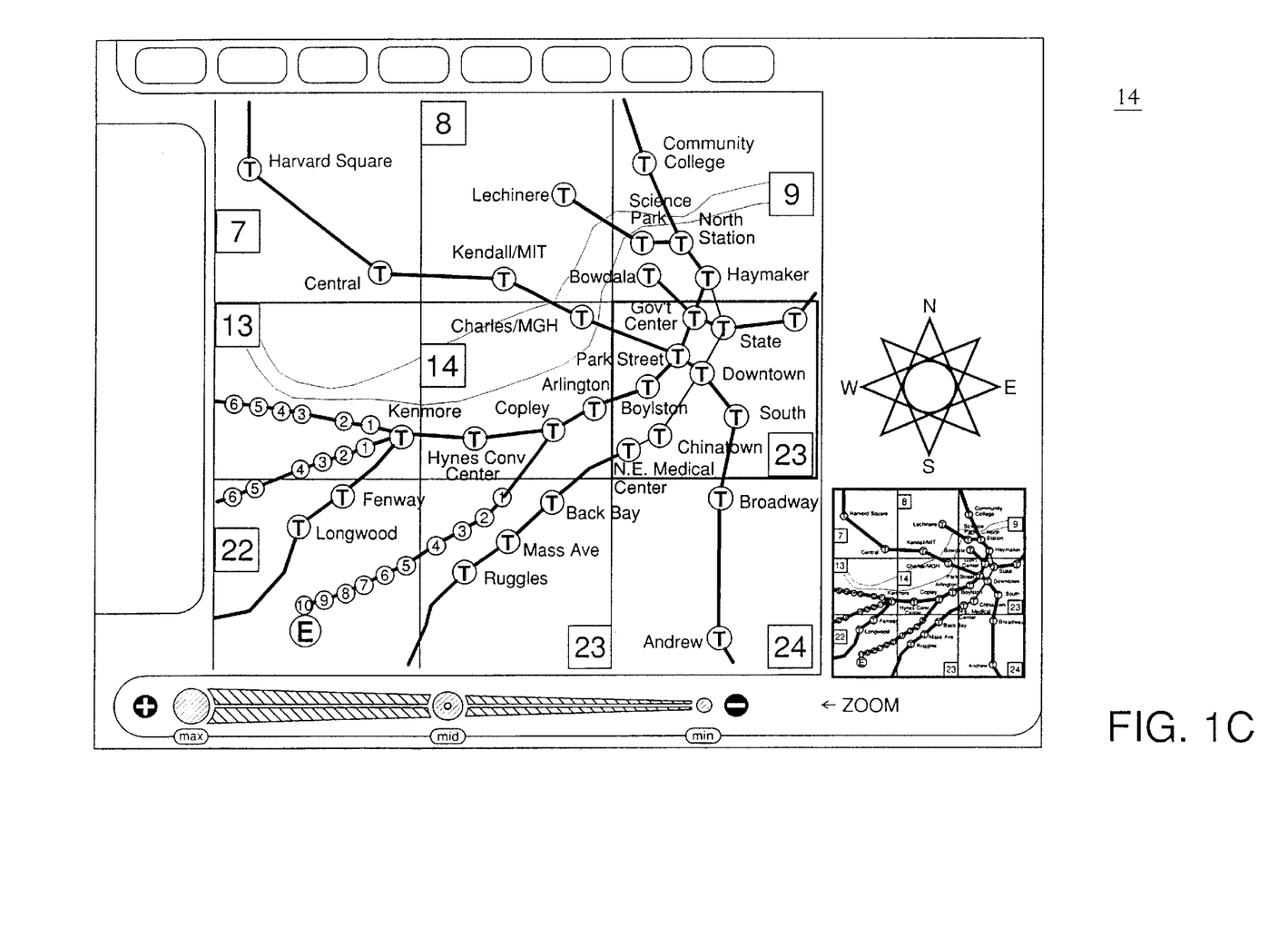
Figure 1D:
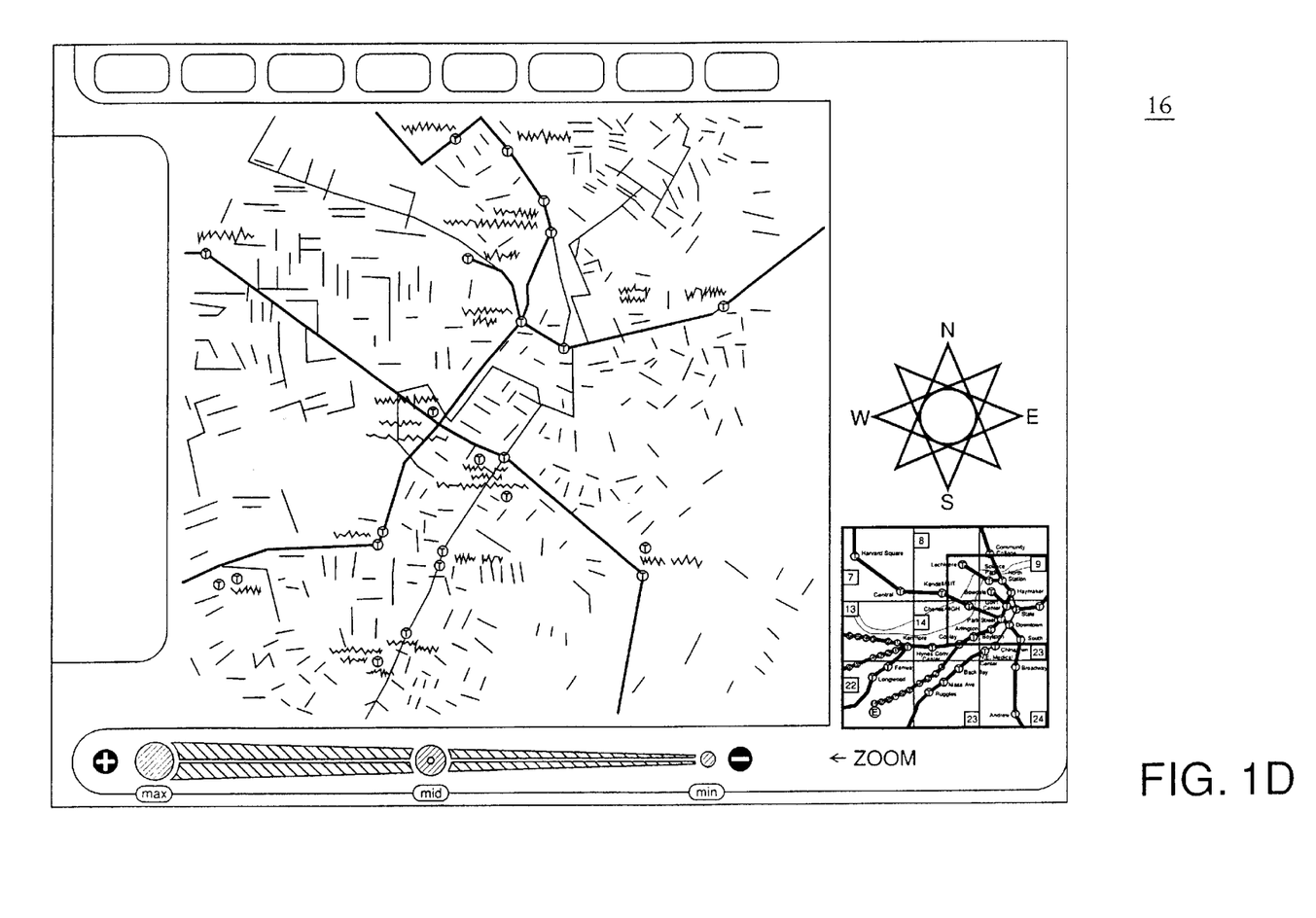
Figure 1E:
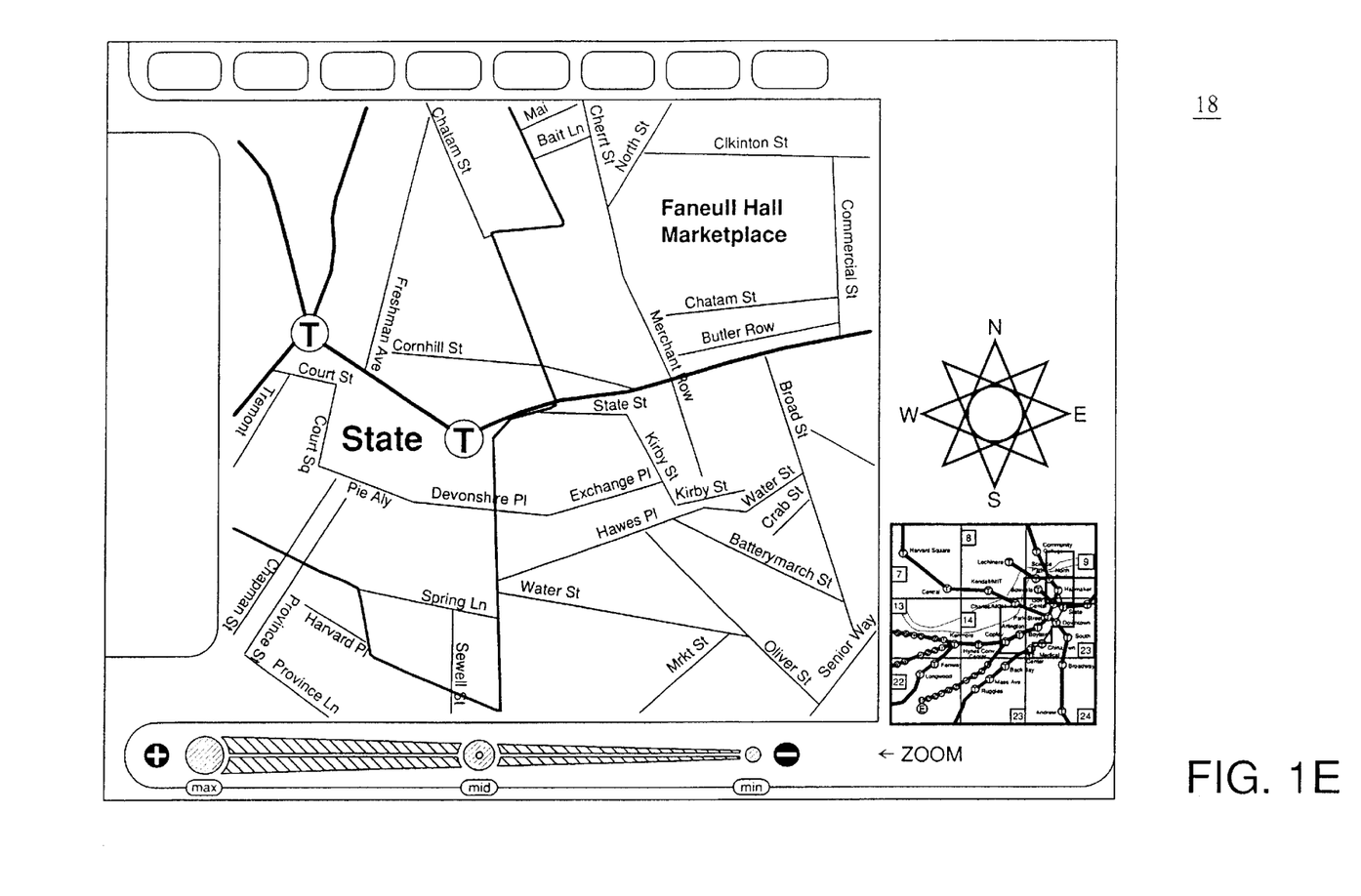

Each possible map screen of a map display is represented and stored as its own separate layer, including (i) map screens showing the geographic area at different resolutions, (ii) map screens with and without icons and information regarding the attractions, and (iii) map screens corresponding to the different events. For example, in one preferred embodiment, three levels of magnification are provided. The lowest resolution map screen and each of its higher resolution sub-regions are displayed as separate map screens, and thus are represented by separate layers. Map screens 14, 16, 18 illustrate such minimum level, intermediate level, and high level resolution display screens, respectively.

Figure 2A:
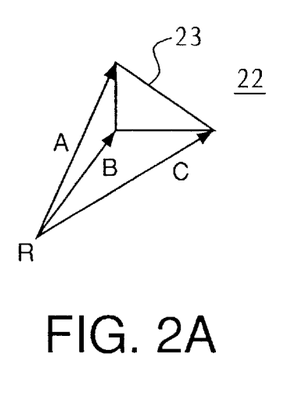
Figure 2B:
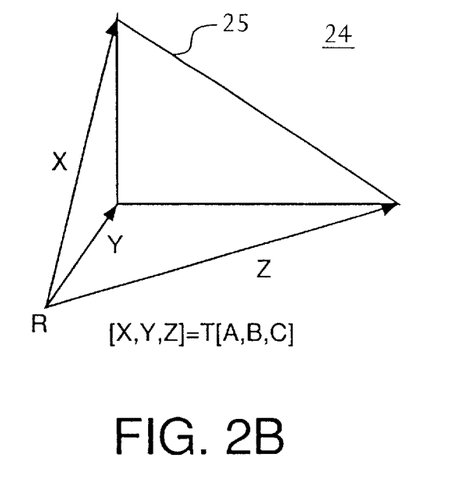

Referring now to FIGS. 2A,B, there are shown the vector graphs 22, 24 for providing differing levels of resolution in the map screens of the present invention. Within the layers of the map displays and events, each point of the display is represented as a vector or combination of vectors having a known magnitude, direction and reference point. For example, the vectors A, B, C are referenced to reference point R and are arranged to represent the corners of the triangle 23 within the vector graph 22.

In order to represent the triangle 25 within the vector graph 24 a transform T is performed upon the vectors A, B, C. The triangle 25 is a magnified representation of the triangle 23. The transform T produces the vectors X, Y, Z which represent the corners of the compressed triangle 25. Thus,

[X, Y, Z]=T [A, B, C]

where T is a transform operating upon the magnitudes and angles of its argument vectors A, B, C. Using vector transforms such as the transform T in this manner the map layers of the invention can represent differing magnifications of a geographic area without distortion of the features represented. Other transforms for performing operations such as translation, rotation and segmentation of vectors within images are also known and can be used in the present invention. Many other kinds of transforms operating upon the vectors of an image are also known for performing the same operation of magnification, translation, rotation, segmentation, etc. of images.

The step of clicking on a selected one of a plurality of delineated regions of a relatively lower resolution map screen is used to obtain a higher resolution display of the selected region and to thereby navigate from one higher resolution map to another. Additionally, zoom buttons are provided on the video display to permit the user to select one of several levels of resolution available in the preferred embodiment. The levels of resolution provided in response to clicking on the zoom buttons are derived using vector methods such as those set forth with respect to the vector graphs 22, 24.

When the map screens of the present invention are directed to venues for different industry categories, one layer can include the locations of one category in a geographic area and another layer can include the locations of another category. Thus, the layer representing the map screen 10 contains the location of a restaurant. In one preferred embodiment a plurality of restaurants in the geographic region displayed is shown in such a layer. The layer representing the map screen 12 contains the location of a pub. A layer in one preferred embodiment can contain a plurality of pubs. Clicking to request these layers results in a map wherein the restaurants or the pubs, respectively, of the geographic area are shown. Layers corresponding to other industries, such as hotels, newsstands, etc., are also provided.

When the maps are directed to events rather than to venues, buttons are used to select events and the layers include indications of the locations relevant to the event corresponding to the selected layer. For example, if a user wants to display the route of the Boston Marathon Race, the route is shown on separate layers that include respective map pages showing the pertinent geographic areas and the route of the race. Clicking on the indicator locations causes a description of the activities taking place at the location to be displayed. The layers for events and the layers for venues can be stored on the same or on differing servers.

Thus, clicking on a delineated region of a relatively lower resolution map display to obtain a higher resolution display of the selected region or clicking upon an icon to obtain a display of specific information results in a request for the new map screen. The request includes the code number of the new map screen. When the code number is received the requested layer is retrieved and transmitted for display to the user.

Furthermore, each layer of a map display can consist of a number of display frames. The display frames associated with a layer are sequentially displayed in order to give the impression of movement when the layer is displayed. All of the display frames associated with a layer in this manner are transmitted together when a request for a multi-frame layer is received. Any number of layers within a map display can be multi-frame layers. The various layers including the multi-frame layers of any number of map displays can be stored on a server of the provider of the system of the invention. A known method for retrieving a specific image from the server includes the use of a directory commonly referred to as a photo path.

Even though the individual layers can correspond to different industry categories or different events, each layer usually includes at least some uniform information. Uniform information is information that is substantially constant from one layer to another, except possibly that it may be displayed at differing magnifications. The uniform information in the layers is usually map information such as the components of the composite map, wherein the components of a composite map are understood to include a subway line map and a street map upon which the subway line is superimposed.

Each map screen, and thus each layer of a map display, can include trademark-locators or icons for indicating the locations of the respective attractions or event sites associated with the map screen. In the preferred embodiment, the icons are trademarks and are disposed on two layers of the multi-layer map. The locators are linked to information on a detail page or profile page of the attraction that is driven by an Application Service Provider (ASP). The ASP used to drive the profile page is well known to those skilled in the art. The ASP-driven profile pages are written in Sequel (SQL), a well known computer language for use in the field of programming form displays. SQL is adapted to allow a user to call information from a database and display a desired record set of a particular web page.

Referring now to FIG. 4, there is shown a profile page 50. When a person acting on behalf of an attraction or event wishes to access the profile page 50 of the attraction or event by way of the internet, the person logs onto the web page of the provider of the method of present invention. The web page can be maintained by a party designated by the provider. Using a predetermined username and password issued to the attraction or event, the profile page 50 assigned to the attraction or event is accessed to permit the person to create, view, or update the profile page 50.

The creation of the profile page 50 is substantially similar to the creation of a conventional data table such as the data tables created using conventional programs such as Microsoft Access. When a profile page 50 is created, a blank database table is created. Content is inserted into the database location corresponding to the banner field 55. Text is entered, for example, in the name field 65, in order to name the profile page 50. Other textual information that the person wants displayed when the icon of the attraction is selected on a display screen is entered into the text field 60.

For example, the address of the attraction, the services offered, and the Universal Resource Locator 70 (URL 70) can be entered into the text field 60 of the profile page 50. Additionally, since the integrated ASP model permits the profile page 50 to substantially represent a mini web page, the trademark, a logo, or any other art work can be entered by the user. Additionally, audio and streaming video can be provided by way of the profile page 50. Profile page 50 can provide multi-line text boxes wherein only a few lines of text are displayed, but a record set having additional text is associated with the displayed text and can be requested for display. The profile pages 50 have corresponding administrative sections. The administrative sections allow a user unlimited access to their profile page for instant text updates.

Profile pages 50 have a default design that is made available at a lower cost than the customizable version. In the default design of the profile page 50, the content of the banner field 55 displayed on the top of the screen is selected by the provider of the method of the present invention. A default background is provided with the default page 50. The user inserts the desired text in the default design in substantially the same manner used for inserting text into customized profile pages 50.

Using a personal computer, PDA, or any other user electronic device adapted for requesting information, a user can activate any layer of a map. When performing the method of the invention over the internet, the user thus sends the request for the specified layer, including the code number of the requested layer, over the internet to the server of the website that provides the method of the present invention. The user then receives the requested layer from the server by way of the internet. Furthermore, at the time of the request, the layer displayed on the user electronic device is transmitted back to the server, and stored until it is requested again by the user. Therefore, the layer retrieval request is accomplished simultaneously with the layer storage transmission. This process can be illustrated schematically as follows.

Figure 3:
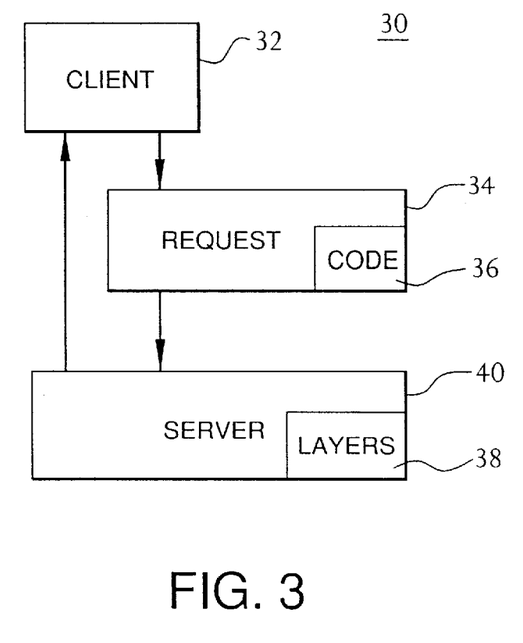
FIG. 3 shows a process flow for the method of requesting a new map screen display in the invention of FIGS. 1 A–E.

Referring now to FIG. 3, there is shown a process flow 30 illustrating the process of requesting a new map screen in accordance with the present invention. In the process flow 30, a request 34 is transmitted by a user client 32. A code number 36 corresponding to a map layer is included in the transmitted request 34. A provider server 40 storing the map layers 38 receives the request 34 from the user client 32. Using the code number 36 included in the request 34 the provider server 40 determines which layer of the stored layers 38 is requested by the user client 32. The requested map layer is selected from the stored layers 38 and transmitted to the user client 32 by the server 40. Transmissions of the request 34 and the requested layer between the user client 32 and the provider server 40 can be by way of any media capable of transmitting requests and images that are suitable for viewing as map displays. For example, the transmission medium can be the internet.

Map displays consisting of any number of map screens are downloadable and executable on a PDA, such as a Palm device or a pocket device, or on a personal computer. Furthermore, the map screens are downloadable and executable on any other device capable of receiving transmissions of the information related to the layers of a map and performing the required operations for their display. The files that are executable within the video display technology of the provider of the inventive method are .swf files, where .swf is the file extension of a well known preferred video display technology.

The .swf files that correspond to the code numbered map layers are preferably transformed by the provider into a format compatible with the receiving device at the time of the request. The files, in a form compatible with the receiving device, are then transmitted by the provider to the user in response to the user request. In an alternate embodiment the provider executable files are transmitted to the receiving device and the transform is performed at the receiving device.

If the receiving device is a wireless device the transformed and transmitted files can be downloaded immediately into the device In another embodiment, a computer can download the files and later transmit them by synchronization or other methods to a further receiving device such as a PDA.

The system and method of the present invention is the subject of companion Application Ser. No. 09/788,170, filed on even date herewith, entitled "BUNDLED MAP SYSTEMS" by Patrick Ruiz, Nicola Valentino, John W. Sumner, Mike Goldstein, Charles Freedman and Craig Runyan.

Without further elaboration, the foregoing so fully illustrates the invention that others may, by applying current or future knowledge, readily adapt the same for use under various conditions of service.

What is claimed is:

1. A method for providing a display of a cartographic map representative of a subway line within a geographic region in a system having a display device with an indicator device for indicating a display location on said display device corresponding to a geographic location within said geographic region, comprising the steps of:
   (a) providing a plurality of map displays representative of at least a portion of said subway line for display on said display device;
   (b) providing a plurality of display layers in accordance with said plurality of map displays for determining a map display of said plurality of map displays when a display layer of said plurality of display layers is applied to said display device;
   (c) displaying a plurality of view select zones corresponding to said plurality of display layers to permit a user to select a display layer in response to selecting a view select zone using said indicator device;
   (d) applying said selected display layer to said display device;
   (e) providing a selected map display on said display device corresponding to said applied display layer including said at least a portion of said subway line;
   (f) storing said plurality of map displays on a map server wherein said display device is disposed at a location remote from said map server;
   (g) compling said map server to said remote device by way of an image transmission medium; and
   (h) transmitting a code number to said map server by way of said image transmission medium in response to selecting said view select zone.

2. The method for providing a display of a subway line of claim 1, comprising the further step of selecting said selected display layer by said map server in response to said transmitted code number and transmitting said selected display layer by way of said image transmission medium.

3. The method for providing a display of a subway line of claim 2, wherein said subway line includes a subway stop having a plurality of user passageways connecting said subway line to a street level comprising the further step of displaying a representation of said subway stop and at least two of said user passageways.

4. The method for providing a display of a subway line of claim 2, comprising the further step of representing a plurality of points on a first display layer representative of a selected geographic region using a first plurality of point vectors, each point vector of said first plurality of point vectors corresponding to a point of said plurality of points.

5. The method for providing a display of a subway line of claim 4, comprising the further step of determining a second display layer representative of said selected geographic region in accordance with said first display layer wherein said first and second display layers have differing resolutions by performing a vector transform upon said plurality of point vectors to determine a second plurality of point vectors, each point vector of said second plurality of point vectors representing a point of said second display layer.

6. The method for providing a display of a subway line of claim 2, comprising the further steps of:
   (a) transmitting said plurality of display layers from a map server to said remote display device by way of an image transmission medium and;
   (b) selecting said selected display layer from said transmitted plurality of display layers at a remote display device.

7. The method for providing a display of a subway line of claim 6 comprising the further step of selecting said selected display layer at said remote display device in accordance with a code number provided in response to selecting said view select zone.

8. The method for providing a display of a subway line of claim 2, including first and second display layers representative of first and second geographic portions of said geographic region wherein said first geographic portion is disposed within said second geographic portion and is a higher resolution representation of a common geographic region within said second geographic portion to provide first and second resolution map displays of said common geographic area.

9. The method for providing a display of a subway line of claim 8, wherein one of said first and second resolution map displays includes a representation of a selected feature of said common geographic area and the other of said first and second resolution map displays does not include said representation of said selected feature.

10. The method for providing a display of a subway line of claim 9, wherein said first and second resolution map displays include respective first and second representations of a selected feature of said common geographic area and one of said first and second representations of said selected feature is interactive and the other of said first and second representations of said selected feature is not interactive.

11. A method for providing a display of a cartographic map representative of a subway line within a geographic region in a system having a display device with an indicator device for indicating a display location on said display device corresponding to a geographic location within said geographic region, comprising the steps of:
   (a) providing a plurality of map displays representative of at least a portion of said subway line for display on said display device;
   (b) providing a plurality of display layers in accordance with said plurality of map displays for determining a map display of said plurality of map displays when a display layer of said plurality of display layers is applied to said display device;
   (c) displaying a plurality of view select zones corresponding to said plurality of display layers to permit a user to select a display layer in response to selecting a view select zone using said indicator device;
   (d) applying said selected display layer to said display device;
   (e) providing a selected map display on said display device corresponding to said applied display layer including said at least a portion of said subway line;
   (f) coupling said map server to said remote display device by way of an image transmission medium;
   (g) transmitting said plurality of display layers from said map server to said remote display device by way of said image transmission medium;
   (h) selecting said selected display layer from said transmitted plurality of display layers at said remote display device; and
   (i) selecting said selected display layer at said remote display device in accordance with a code number provided in response to selecting said view select zone.

12. The method for providing a display of a subway line of claim 11, comprising the further step of representing a plurality of points on a first display layer representative of a selected geographic region using a first plurality of point vectors, each point vector of said first plurality of point vectors corresponding to a point of said plurality of points.

13. The method for providing a display of a subway line of claim 12, comprising the further step of determining a second display layer representative of said selected geographic region in accordance with said first display layer wherein said first and second display layers have differing resolutions by performing a vector transform upon said plurality of point vectors to determine a second plurality of point vectors, each point vector of said second plurality of point vectors representing a point of said second display layer.

14. A method for providing a display of a cartographic map representative of a subway line within a geographic region in a system having a display device with an indicator device for indicating a display location on said display device corresponding to a geographic location within said geographic region, comprising the steps of:
   (a) providing a plurality of map displays representative of at least a portion of said subway line for display on said display device;
   (b) providing a plurality of display layers in accordance with said plurality of map displays for determining a map display of said plurality of map displays when a display layer of said plurality of display layers is applied to said display device;
   (c) displaying a plurality of view select zones corresponding to said plurality of display layers to permit a user to select a display layer in response to selecting a view select zone using said indicator device;
   (d) applying said selected display layer to said display device;
   (e) providing a selected map display on said display device corresponding to said applied display layer including said at least a portion of said subway line;
   (f) representing a plurality of points on a first display layer representative of a selected geographic region using a first plurality of point vectors, each point vector of said first plurality of point vectors corresponding to a point of said plurality of points; and
   (g) determining a second display layer representative of said selected geographic region in accordance with said first display layer wherein said first and second display layers have differing resolutions by performing a vector transform upon said plurality of point vectors to determine a second plurality of point vectors, each point vector of said second plurality of point vectors representing a point of said second display layer.

15. The method for providing a display of a subway line of claim 14, wherein said subway line includes a subway stop having a plurality of user passageways connecting said subway line to a street level comprising the further step of displaying a representation of said subway stop and at least two of said user passageways.

16. The method for providing a display of a subway line of claim 14, including a navigation display having a plurality of clicking points, comprising the further steps of:
   (a) determining whether a clicking point of said plurality of clicking points is indicated by said indicator device; and
   (b) selecting a differing display layer in response to said clicking point determination.

17. The method for providing a display of a subway line of claim 14, including first and second display layers representative of first and second geographic portions of said geographic region wherein said first geographic portion is disposed within said second geographic portion and is a higher resolution representation of a common geographic region within said second geographic portion to provide first and second resolution map displays of said common geographic area.

18. The method for providing a display of a subway line of claim 17, wherein one of said first and second resolution map displays includes a representation of a selected feature of said common geographic area and the other of said first and second resolution map displays does not include said representation of said selected feature.

19. The method for providing a display of a subway line of claim 17, wherein said first and second resolution map displays include respective first and second representations of a selected feature of said common geographic area and one of said first and second representations of said selected feature is interactive and the other of said first and second representations of said selected feature is not interactive.

20. The method for providing a display of a subway line of claim 14, wherein said cartographic map is representative of a plurality of subway lines comprising the further step of displaying at least two subway lines of said plurality of subway lines upon said display device.

21. The method for providing a display of a subway line of claim 20, comprising the further steps of determining and displaying a walking distance between selected points on said at least two subway lines upon said display device.

22. The method for providing a display of a subway line of claim 14, including a low resolution map display formed of a plurality of map subregions and a plurality of high resolution map displays corresponding to said plurality of map subregions.

23. The method for providing a display of a subway line of claim 22, wherein the step of providing said selected map display comprises providing a high resolution map display representative of a selected map subregion corresponding to said selected view select zone.

24. The method for providing a display of a subway line of claim 22, wherein said view select zones comprise the map subregions of said plurality of map subregions.

25. The method for providing a display of a subway line of claim 22, comprising the further steps of determining and displaying a representation of a walking route over a portion of said geographic region represented by said selected map display upon said display device.

26. The method for providing a display of a subway line of claim 25, comprising the further steps of determining and displaying the distance of said walking route upon said display device.

27. The method for providing a display of a subway line of claim 26, wherein information regarding an attraction located in the vicinity of said walking route is stored on a map server.

28. The method for providing a display of a subway line of claim 27, comprising the further step of displaying said stored information on said display device in response to indicating an icon within said selected map display by said indicator device.

29. The method for providing a display of a subway line of claim 28, comprising the further step of indicating a location within said selected map display corresponding to the location of said attraction within said geographic region.

30. The method for providing a display of a subway line of claim 28, wherein said icon is a trademark of said attraction.

31. The method for providing a display of a subway line of claim 29, comprising the further step of indicating said icon at corresponding locations within a plurality of said map displays.

32. The method for providing a display of a subway line of claim 22, wherein the map displays of said plurality of map displays represent differing events.

33. The method for providing a display of a subway line of claim 32, comprising the further step of selecting said map displays representing said differing events using said indicator device.

34. The method for providing a display of a subway line of claim 33, comprising the further step of selecting said map displays by indicating a trademark.

35. The method for providing a display of a subway line of claim 22, wherein an attraction is located within said geographic region, comprising the further steps of:
   (a) storing information corresponding to said attraction;
   (b) displaying a representation of said attraction on said display device; and
   (c) displaying said corresponding stored information on said display device when said representation of said attraction is selected using said indicator device.

36. The method for providing a display of a subway line of claim 35, comprising the step of receiving said corresponding stored information by way of a profile page.

37. The method for providing a display of a subway line of claim 14, wherein said remote display device is coupled to a hand held device.

38. The method for providing a display of a subway line of claim 14, comprising the further step of coupling said map server to said remote display device by way of an image transmission medium.

39. The method for providing a display of a subway line of claim 38, wherein said image transmission medium comprises an internet transmission medium.

40. The method for providing a display of a subway line of claim 38, comprising the further step of transmitting a code number to said map server by way of said image transmission medium in response to selecting said view select zone.

41. The method for providing a display of a subway line of claim 40, comprising the further step of selecting said selected display layer by said map server in response to said transmitted code number and transmitting said selected display layer by way of said image transmission medium.

42. The method for providing a display of a subway line of claim 38, comprising the further steps of:
   (a) transmitting said plurality of display layers from said map server to said remote display device by way of said image transmission medium and;
   (b) selecting said selected display layer from said transmitted plurality of display layers at said remote display device.

43. The method for providing a display of a subway line of claim 41 comprising the further step of selecting said selected display layer at said remote display device in accordance with a code number provided in response to selecting said view select zone.

44. A method for providing a display of a cartographic map representative of a subway line within a geographic region in a system having a display device with an indicator device for indicating a display location on said display device corresponding to a geographic location within said geographic region, comprising the steps of:
   (a) providing a plurality of map displays representative of at least a portion of said subway line for display on said display device;
   (b) providing a plurality of display layers in accordance with said plurality of map displays for determining a map display of said plurality of map displays when a display layer of said plurality of display layers is applied to said display device;
   (c) displaying a plurality of view select zones corresponding to said plurality of display layers to permit a user to select a display layer in response to selecting a view select zone using said indicator device;
   (d) applying said selected display layer to said display device;
   (e) providing a selected map display on said display device corresponding to said applied display layer including said at least a portion of said subway line; and
   (f) preliminary first and second display layers representative of first and second geographic portions of said geographic region wherein said first geographic portion is disposed within said second geographic portion and is a higher resolution representation of a common geographic region within said second geographic portion to provide first and second resolution map displays of said common geographic area.

45. The method for providing a display of a subway line of claim 44, wherein one of said first and second resolution map displays includes a representation of a selected feature of said common geographic area and the other of said first and second resolution map displays does not include said representation of said selected feature.

46. The method for providing a display of a subway line of claim 44, wherein said first and second resolution map displays include respective first and second representations of a selected feature of said common geographic area and one of said first and second representations of said selected feature is interactive and the other of said first and second representations of said selected feature is not interactive.

47. The method for providing a display of a subway line of claim 44, including a navigation display having a plurality of clicking points, comprising the further steps of:
   (a) determining whether a clicking point of said plurality of clicking points is indicated by said indicator device; and
   (b) selecting a differing display layer in response to said clicking point determination.

48. The method for providing a display of a subway line of claim 44, wherein said subway line includes a subway stop having a plurality of user passageways connecting said subway line to a street level comprising the further step of displaying a representation of said subway stop and at least two of said user passageways.

49. The method for providing a display of a subway line of claim 44, comprising the further step of coupling said map server to said remote display device by way of an image transmission medium.

50. The method for providing a display of a subway line of claim 49, comprising the further step of transmitting a code number to said map server by way of said image transmission medium in response to selecting said view select zone.

51. The method for providing a display of a subway line of claim 50, comprising the further step of selecting said selected display layer by said map server in response to said transmitted code number and transmitting said selected display layer by way of said image transmission medium.

52. The method for providing a display of a subway line of claim 44, comprising the further step of representing a plurality of points on a first display layer representative of a selected geographic region using a first plurality of point vectors, each point vector of said first plurality of point vectors corresponding to a point of said plurality of points.

53. The method for providing a display of a subway line of claim 52, comprising the further step of determining a second display layer representative of said selected geographic region in accordance with said first display layer wherein said first and second display layers have differing resolutions by performing a vector transform upon said plurality of point vectors to determine a second plurality of point vectors, each point vector of said second plurality of point vectors representing a point of said second display layer.

54. The method for providing a display of a subway line of claim 44, including a low resolution map display formed of a plurality of map subregions and a plurality of high resolution map displays corresponding to said plurality of map subregions.

55. The method for providing a display of a subway line of claim 54, wherein said view select zones comprise the map subregions of said plurality of map subregions.

56. A method for providing a display of a cartographic map representative of a subway line within a geographic region in a system having a display device with an indicator device for indicating a display location on said display device corresponding to a geographic location within said geographic region, comprising the steps of:

(a) providing a plurality of map displays representative of at least a portion of said subway line for display on said display device;

(b) providing a plurality of display layers in accordance with said plurality of map displays for determining a map display of said plurality of map displays when a display layer of said plurality of display layers is applied to said display device;

(c) displaying a plurality of view select zones corresponding to said plurality of display layers to permit a user to select a display layer in response to selecting a view select zone using said indicator device;

(d) applying said selected display layer to said display device;

(e) providing a selected map display on said display device corresponding to said applied display layer including said at least a portion of said subway line;

(f) determining whether a clicking point of said plurality of clicking points is indicated by said indicator device; and (g) selecting a differing display layer in response to said clicking point determination.

57. The method for providing a display of a subway line of claim 56, comprising the further step of representing a plurality of points on a first display layer representative of a selected geographic region using a first plurality of point vectors, each point vector of said first plurality of point vectors corresponding to a point of said plurality of points.

58. The method for providing a display of a subway line of claim 57, comprising the further step of determining a second display layer representative of said selected geographic region in accordance with said first display layer wherein said first and second display layers have differing resolutions by performing a vector transform upon said plurality of point vectors to determine a second plurality of point vectors, each point vector of said second plurality of point vectors representing a point of said second display layer.

59. The method for providing a display of a subway line of claim 56, including a low resolution map display formed of a plurality of map subregions and a plurality of high resolution map displays corresponding to said plurality of map subregions.

60. The method for providing a display of a subway line of claim 56, wherein said view select zones comprise the map subregions of said plurality of map subregions.

61. The method for providing a display of a subway line of claim 56, wherein the step of providing said selected map display comprises providing a high resolution map display representative of a selected map subregion corresponding to said selected view select zone.

62. The method for providing a display of a subway line of claim 56, including first and second display layers representative of first and second geographic portions of said geographic region wherein said first geographic portion is disposed within said second geographic portion and is a higher resolution representation of a common geographic region within said second geographic portion to provide first and second resolution map displays of said common geographic area.

63. The method for providing a display of a subway line of claim 50, wherein said subway line includes a subway stop having a plurality of user passageways connecting said subway line to a street level comprising the further step of displaying a representation of said subway stop and at least two of said user passageways.

64. The method for providing a display of a subway line of claim 60, wherein said cartographic map is representative of a plurality of subway lines comprising the further step of displaying at least two subway lines of said plurality of subway lines upon said display device.

* * * * *